(12) United States Patent
Hedenetz

(10) Patent No.: US 6,684,146 B1
(45) Date of Patent: Jan. 27, 2004

(54) STEERING AND BRAKING SYSTEM FOR A MOTOR VEHICLE

(75) Inventor: Bernd Hedenetz, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/959,542

(22) PCT Filed: Mar. 30, 2000

(86) PCT No.: PCT/EP00/02815
§ 371 (c)(1),
(2), (4) Date: Feb. 6, 2002

(87) PCT Pub. No.: WO00/64716
PCT Pub. Date: Nov. 2, 2000

(30) Foreign Application Priority Data

Apr. 27, 1999 (DE) .......................... 199 18 995

(51) Int. Cl.⁷ ............................... B60T 7/00; B60T 8/00
(52) U.S. Cl. ............................. 701/70; 701/41
(58) Field of Search ..................... 701/41, 70

(56) References Cited

U.S. PATENT DOCUMENTS 5,405,182 A * 4/1995 Ewe et al. ................. 303/15
6,362,729 B1 * 3/2002 Hellmann et al. .......... 340/436

FOREIGN PATENT DOCUMENTS

| DE | 38 25 280 A1 | 7/1988 |
|---|---|---|
| DE | 40 14 561 A1 | 5/1990 |
| DE | 40 39 005 A1 | 12/1990 |
| DE | 43 39 570 A1 | 11/1993 |
| DE | 44 01 416 C2 | 1/1994 |
| EP | 0 754 611 A1 | 6/1996 |
| WO | WO 91/17069 | 11/1991 |

OTHER PUBLICATIONS

International Search Report and translation of pertinent excerpts.
German Search Report and translation of pertinent excerpts.

* cited by examiner

Primary Examiner—Yonel Beaulieu
(74) Attorney, Agent, or Firm—Crowell & Moring LLP

(57) ABSTRACT

A vehicle steering and braking system includes a distributed control loop in which a state-determining device for generating signals that describe current vehicle operation, an arithmetic unit for generating set point signals and a regulator unit for generating actuator signals are connected to one another by a data bus. The signals of the devices and units, which are transmitted via the data bus, are combined in cycles, one complete set of information being capable of being transmitted via the data bus in each cycle. Within a single cycle the signals of the respective units and devices are generated and transmitted via the data bus in the sequence: arithmetic unit—state-determining device—regulator unit. Each of the components comprising the arithmetic unit—state-determining device and regulator unit, however, can form the starting point of the sequence without changing the sequence itself.

17 Claims, 3 Drawing Sheets

[N] Message
[ ] Initialization

|  | | a1 | a2 | f1 | f2 | b1 | b2 | b3 | b4 | s1 | s2 |
|---|---|---|---|---|---|---|---|---|---|---|---|
| Cycle 1 | Data bus 8a | N | N | N | N | N | I | N | I | N | N |
|  | Data bus 8b | N | N | N | N | I | N | I | N | N | N |
| Cycle 2 | Data bus 8a | N | N | N | N | I | N | I | N | N | N |
|  | Data bus 8b | N | N | N | N | N | I | N | I | N | N |

STEERING AND BRAKING SYSTEM FOR A MOTOR VEHICLE

BACKGROUND AND SUMMARY OF THE INVENTION

This application claims the priority of PCT document PCT/EP00/02815 filed Mar. 30, 2000 and German patent document 199 18 995.1 filed Apr. 27, 1999, the disclosures of which are expressly incorporated by reference herein.

The invention relates to a steering and braking system for a vehicle.

European patent document EP 07 54 611 A1 discloses a drive-by-wire steering and braking system which has a multiple partially redundantly configured system components such as arithmetic units and actuators for controlling the steering and the service brake of the vehicle as a function of variables measured by sensors, according to defined control laws. The sensor signals are firstly fed to an arithmetic unit with three synchronously operating arithmetic devices which generate actuating signals that are fed via a communications device (data bus) to vehicle modules, each its own power supply and final positioning elements for the brake, steering, suspension and drive. The communications device is, like the arithmetic unit, of redundant configuration and comprises in total three data buses. The power supply of the system is also provided redundantly.

One object of the invention is to provide a steering and braking system of the type described above, which is reliable, fault-tolerant and of simple design.

This and other objects and advantages are achieved by the steering and braking system according to the invention, which includes a distributed control loop with an arithmetic unit for generating set point signals and a regulator unit for generating actuator signals for the actuators. The arithmetic unit, the regulator unit and a state-determining device in which state signals describing the current vehicle situation are determined or generated are connected to one another by a data bus in which signals are successively transmitted between the various units and/or devices at defined time intervals. The signals of the devices and units are combined in cycles, one complete set of information being capable of being transmitted via the data bus in each cycle.

According to the innovation, within a single cycle the signals of the various units and devices are generated in a specific series or sequence, and transmitted via the data bus; in particular, in the sequence: arithmetic unit—state-determining device—regulator unit. Accordingly, in each cycle, set point signals for steering and/or brake are first generated in the arithmetic unit and transmitted via the data bus; then signals describing the vehicle state are generated in the state-determining device and transmitted via the bus; and finally the actuating signals for the actuators are generated in the regulator unit and also transmitted via the data bus. Each of the components comprising the arithmetic unit—state-determining device and regulator unit can form the starting point of the sequence without changing the sequence itself. Instead of the series: arithmetic unit—state-determining device—regulator unit, it is therefore also possible to have the series: state-determining device—regulator unit—arithmetic unit, as well as regulator unit—arithmetic unit—state-determining device. These series have equal value to one another.

Because the data bus connects all the devices and units of the steering and braking system to one another, it is ensured that the signals of one unit or device are available to all the other components of the system. The defined sequence: arithmetic unit—state-determining device—regulator unit ensures that, first of all in the arithmetic unit, the set point signals are generated which may be required in the state-determining device, and at least in the regulator unit in which a set point/actual value comparison is carried out in order to generate actuating signals. The signals generated in the state-determining device are also required in the regulator unit for generating the actual signals and/or actuating signals for the actuators of the brake and of the steering.

On the other hand, information on the actual state of the actuators and/or of the regulator unit itself (for example a status display from which the instantaneous operating status is apparent) can be fed by the regulator unit to, in particular, the arithmetic unit via the data bus. Because the signals of the regulator unit are generated at the end of a cycle, while the signals of the arithmetic unit are generated at the start of a cycle, the arithmetic unit can react directly to the information of the preceding signals of the regulator unit at the start of a following cycle. The information flow from the regulator unit to the arithmetic unit provides the advantage that suitable strategies for the computation of the set point values, which are adapted to the current situation, can be implemented in the arithmetic unit as a function of the state of the regulator unit and/or of the actuators. As a result, it is in particular possible to maintain the function of a faulty regulator unit or of a faulty actuator without restriction (or with only a small degree of restriction) of the functionality at an exclusively electronic level. In this manner, fault tolerance can be realized without additional mechanical or hydraulic hardware components. In addition to fault tolerance, this arrangement provides the advantage that the costs and the weight of the steering and braking system are reduced.

In contrast to the prior art devices, which are based on event control, in the present invention a timed approach is used in which actions are carried out in accordance with a predefined communications matrix at fixed times and/or in predetermined time windows (slots), each time window being assigned an action of a device or unit. The duration of a time window or the distance between two successive time windows is expediently constant.

As a result, high-speed control loops can be obtained in distributed steering and braking systems and redundant arithmetic units can be easily coupled. The timed signal transmission via the data bus in the manner of a communications matrix or of a communications schedule increases safety, improves availability and can be tested more easily for operational capability in the development phase and in quality assurance.

In one embodiment of the invention, at least some of the units and devices are of fault-tolerant, in particular redundant design. This preferably includes the arithmetic unit for generating the set point signals and the regulator unit for the steering. These units must also be fully operational for stabilizing the vehicle, even in limiting operating ranges in which high-speed, regulated steering interventions may be necessary, because otherwise there is the risk of losing control of the vehicle. A fault-tolerant design of the units relating to the steering ensures that the vehicle can be controlled even when a function fails.

On the other hand, it is not absolutely necessary for the units relating to the brake to be of fault-tolerant or redundant design. These units can, by switching them off, be placed in a fail-safe state in which faulty signals are no longer generated. Even in the event of a failure of a unit assigned to a specific wheel brake, it is possible for the brake function to be assumed by one or more of the remaining units of the other wheel brakes. Functions for chassis adjustments are carried out do not need to be made fault-tolerant or redundant either.

Redundant units and/or devices advantageously transmit and receive the signals with offset timing, which provides fault tolerance with respect to electronic interference, for example EMC interference. In the event of individual faults occurring within a time window in which the signal of a unit and/or a device is transmitted, a correct signal of the second unit or device is available in the slot with offset timing. The messages or signals of redundant units or devices are preferably transmitted in directly successive time windows, expediently within one cycle, which facilitates a matching of the redundant messages.

In one preferred embodiment, initialization signals are generated regularly in each cycle in at least one unit in the steering and braking system, and transmitted via the data bus. These initialization signals are used to initialize and synchronize the units and devices coupled to the data bus. Within one cycle, initialization signals, which increase the system's resistance to electromagnetic interference, are advantageously generated by at least two different units. The units which generate the initializatior signals are expediently vehicle components with comparable functions, in particular regulator units (for example a multiplicity of braking regulating units) which are assigned to the different wheel brakes. In two successive cycles, the initialization signals can be generated in different units.

Two data buses are advantageously provided, signals being transmitted on the data buses permanently and synchronously within one cycle, but said signals can differ. It has proven advantageous in particular if initialization signals are transmitted in a chronologically alternating fashion on the two data buses within one cycle.

Other objects, advantages and novel features of the present invention will become apparent from the following detailed description of the invention when considered in conjunction with the accompanying drawings.

DETAILED DESCRIPTION OF THE DRAWINGS

In the exemplary embodiments illustrated in FIGS. 1a to 3b, identical components are provided with identical reference symbols.

Figures 1A, 1B:
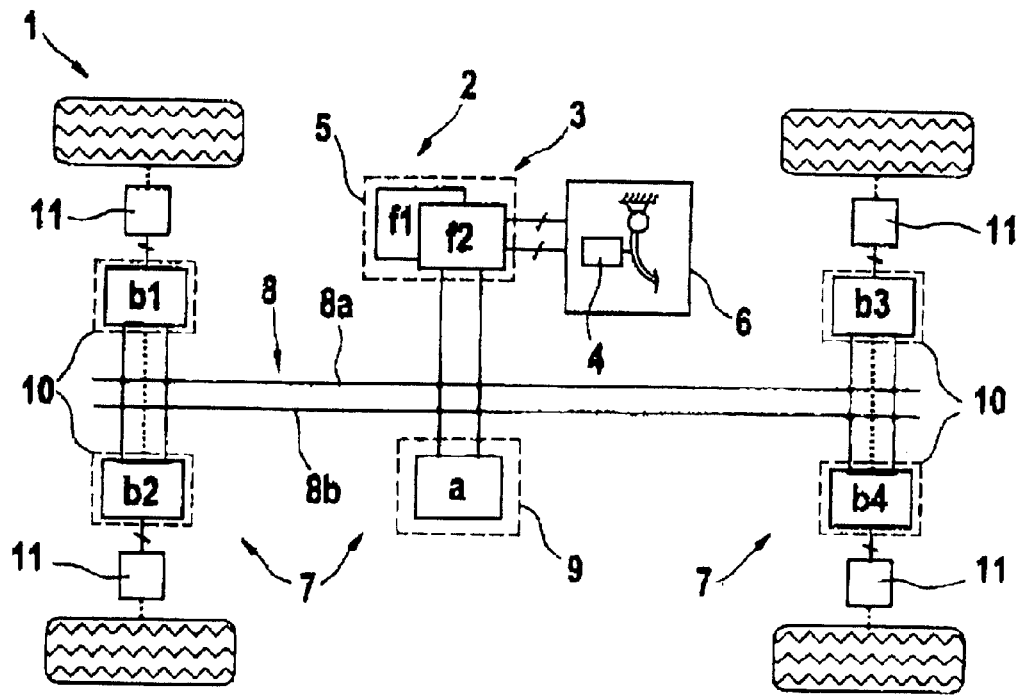
FIG. 1a shows a schematic view of a vehicle with a drive-by-wire braking system.
FIG. 1b shows a communications matrix which is assigned to the vehicle according to FIG. 1a, which includes the signal pattern used on the data buses.

The vehicle 1 illustrated in FIG. 1a (in particular a motor vehicle with an internal combustion engine) has a drive-by-wire system 2 which is embodied in the exemplary embodiment shown as a braking system for electrically or electronically controlling and regulating the vehicle brakes. The drive-by-wire system 2 comprises a state-determining device 3 which is used to generate state signals describing the vehicle state, a control and regulator unit 7 and braking actuators 11, acted on by the control and regulator unit 7, for activating the individual wheel brakes. The state-determining device 3 and the control and regulator unit 7 are connected to one another by a communications device 8 via which signals can be interchanged between the individual units and devices.

The state-determining device 3 comprises of a measuring device 4, for measuring the activation of a pedal unit 6, and a computational unit 5 for evaluating the measurement signals of the measuring device 4. The pedal unit 6 comprises, in the exemplary embodiment according to FIG. 1a, a brake pedal whose position and/or whose change in position is measured by the measuring device 4. The measurement signals are fed to the computational unit 5 and evaluated in the computational unit 5, and examined and further processed in particular with respect to the evaluation of a driver's request. This results in state signals which describe the current state of the pedal unit 6 and which are fed to the communications device 8 to be passed on to the further components of the braking system. The computational unit 5 is of redundant configuration and is composed of two computational devices f1, f2 in which essentially the same operations are carried out simultaneously.

The control and regulator unit 7 is conceived as a distributed control loop which is assigned an arithmetic unit 9 with an arithmetic device a, and a regulator unit 10 with distributed braking regulating units b1, b2, b3, b4 for, in each case, one wheel brake on a wheel of the vehicle. Set point signals for the brakes are generated in the arithmetic device a of the arithmetic unit 9 as a function of vehicle-specific state variables such as the attitude angle, velocity, accelerations, etc. The set point signals are made available to the other system components via the communications device 8. In the braking regulator units b1, b2, b3, b4, actuating signals which are fed to the brake actuators 11 in order to activate the individual wheel brakes are generated in accordance with an underlying regulating law, taking into account the set point signals and actual signals.

The communications device 8 is also of redundant design and is composed of two data buses 8a, 8b which logically link the various components of the brake system to one another for a signal transmission.

FIG. 1b is a schematic view a communications matrix from which the chronological sequence of the data transfer via the data buses between the various components of the brake system can be seen. The columns of the communications matrix indicate time windows or slots, and each slot is assigned a signal transmission N or I of a component a, f1, f2, b1, b2, b3, b4 of the brake system, N designating a message value and I an initialization value. The rows of the communications matrix constitute the message transfer in two successive cycles, and data is transmitted synchronously within one cycle on two buses which are arranged in parallel.

The series within one cycle is retained—in relation to the system components as a whole—over all the cycles and is identical for both data buses, while the signals are transmitted via the communications device in each cycle in a series defined by the following sequence: arithmetic unit—state-determining device—regulator unit.

Alternatively, the signals can be transmitted in the series state-determining device—regulator unit—arithmetic unit, as well as regulator unit—arithmetic unit—state-determining device. In the latter series also, the sequence or order of these three units/devices relative to one another remains the same. Each of the units/devices can form, within the series, a starting point for one of the aforesaid series for the signal transmission in a cycle, the sequence itself being independent of the starting point. Each series can have further components of the steering and braking system connected upstream or downstream; in this case, the starting point relates only to the start of the signal transmission within the sequence arithmetic unit—state-determining device—regulator unit. If appropriate, the starting point of the sequence viewed over the cycles changes.

In each cycle, a message value N is first transferred in the arithmetic device a via the communications device, and then this is followed by a message value N of the computational devices f1, f2 of the state-determining device 3 and, finally, message values N and initialization values I of the braking regulating units b1 to b4 are transferred. The message value N of the arithmetic unit 9 with the arithmetic device a represents set point signals, the message value N of the state device 3 with the computational devices f1, f2 represent state signals which represent the state of the brake pedal or the driver's request in accordance with the brake pedal position, and the message value N of the braking regulating units b1 to b4 represents actual signals which represent the status of the brake actuators 11 of the four wheel brakes. The initialization value I of the braking regulating units b1 to b4 is used to initialize and synchronize the units and devices coupled to the data bus.

Within one cycle (Cycle 1 in FIG. 1b), the signal type to be transmitted differs between the two data buses only with respect to the regulator units b1 to b4. In the cycle 1, message values N and initialization values I are alternately transmitted on the bus 8a in the braking regulating units, starting with a message value N in the time window of the first braking regulating unit b1. In the same cycle, signals are simultaneously transmitted on the bus 8b, the signal type of the arithmetic unit with the arithmetic device a and the signal type of the state-determining device with the computational devices f1, f2 being identical on both buses; message values N are transmitted exclusively. In the braking regulating units b1 to b4, message values N and initialization values I are transmitted within one time window, but on different data buses, offset with respect to a braking regulating unit so that an initialization value I on the bus 8b is assigned to a message value N on the bus 8a, or vice versa.

In the following cycle (Cycle 2 in FIG. 1b), the signal type for the arithmetic unit and the state-determining device do not differ either, and message values N are transmitted in all the time windows for both buses for these two system components. In the braking regulating units b1 to b4, message values N and initialization values I are in turn transmitted offset with respect to the two data buses, but the series has been interchanged in comparison with the first cycle.

Figures 2A, 2B, 2C:
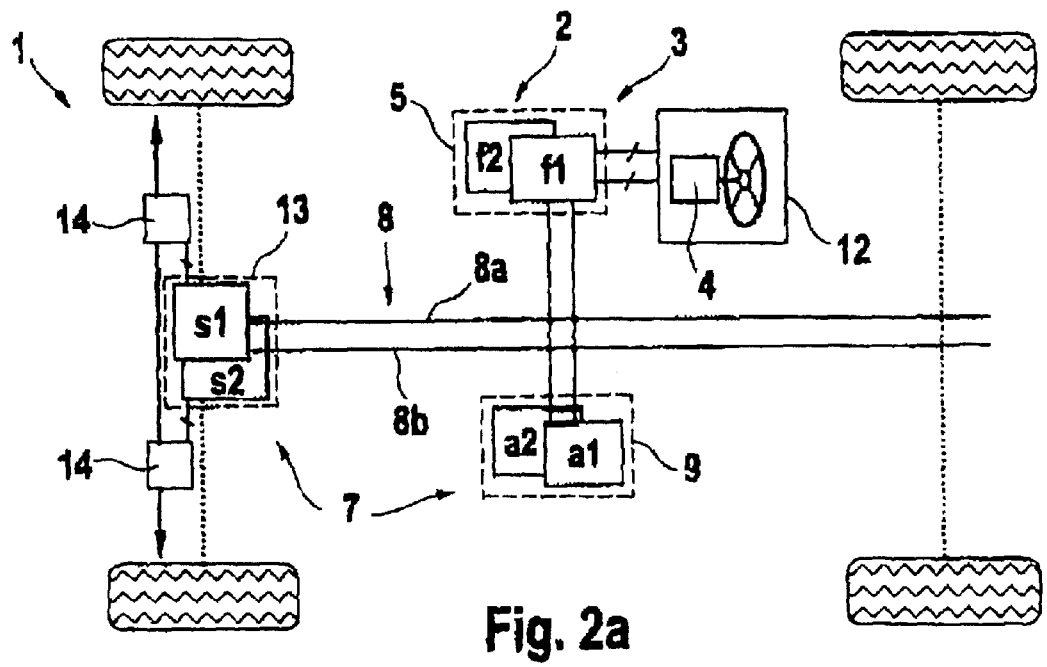
FIGS. 2a, 2b, 2c show a view which is comparable to FIGS. 1a, 1b but with a drive-by-wire steering system.

In the exemplary embodiment illustrated in FIGS. 2a to 2c, the vehicle 1 is equipped with a drive-by-wire system 2 which is embodied as a steering system. The steering system comprises in turn a state-determining device 3, an arithmetic unit 9, a regulating and control unit 7 and steering actuators 14, a communications device 8 with two data buses 8a, b being provided for the signal transmission. The state-determining device 3 includes a measuring device 4 which measures the steering angle and, if appropriate, also the steering angle velocity of a steering unit 12, as well as the computational unit 5 which is provided with redundant computational devices f1, f2, and which processes the measurement signals of the measuring device 4, in particular with respect to the evaluation of a driver's request, and generates therefrom state signals which are made available to the other system components of the steering system.

The control and regulator unit 7 comprises the arithmetic unit 9 which is provided with two arithmetic devices a1, a2 and generates set point signals for the steering as a function of the vehicle state variables, and the regulator unit 13 which is also of redundant design and which has two steering regulating units s1, s2 in which actuating signals for the steering actuators 14 are generated.

The communications matrix according to FIG. 2b shows a preferred sequence schema for the transmission of signals on the communications device 8 for a steering system according to FIG. 2a. Generally, in each cycle and in each data bus, message values N of the two arithmetic devices a1, a2 of the arithmetic unit 9 are transmitted first, then message values N of the computational devices f1, f2 of the state-determining device 3 and finally message values N and initialization values I of the steering regulating units s1, s1 are transmitted alternately. In the first cycle, firstly a message value N is transmitted in the steering regulating unit s1 in the region of the regulator unit 13 in the first bus, followed by the transmission of an initialization value I in the steering regulating unit s2 in the next time window. In the second bus, in the reverse order, an initialization value I is transmitted first in the region of the regulator unit 13 by s1 and then a message value N is transmitted by s2. In the second cycle, an initialization value I is first transmitted in the time window by s1 in the first bus, and a message value is transmitted in s2; in second bus, the signal type is generated in the reverse order.

Figures 3A, 3B:
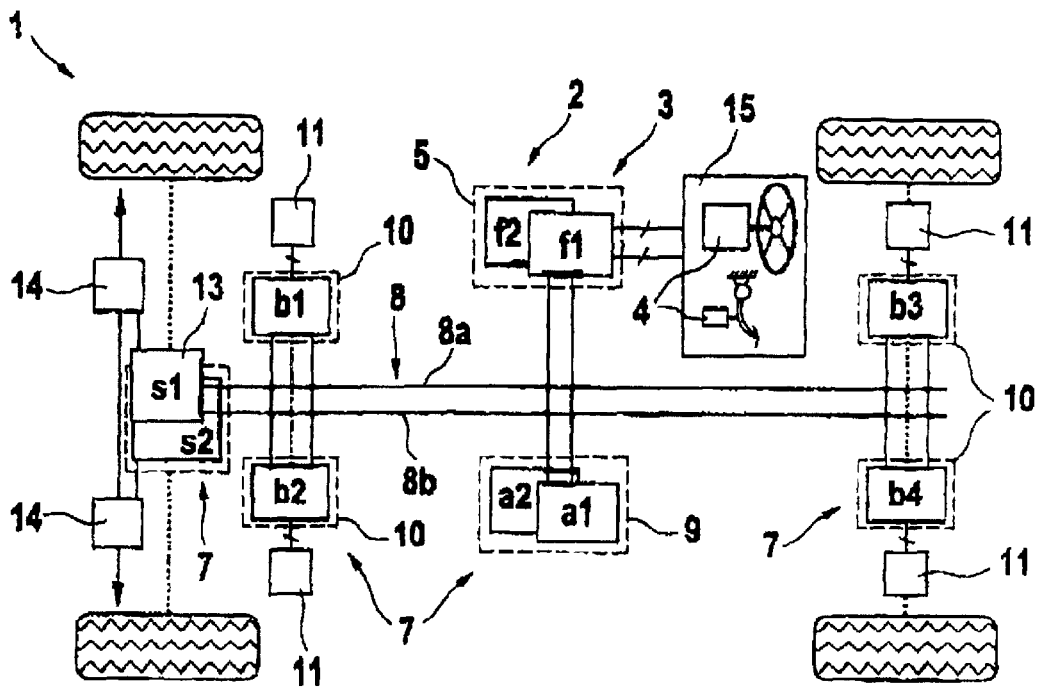
FIGS. 3a, 3b show a drive-by-wire steering and braking system.

FIG. 2c shows a further example of a communications matrix which permits more rapid reconfiguration in the event of a fault. In the region of the first two time windows which are assigned to the arithmetic devices a1, a2 of the arithmetic unit 9, a signal transmission occurs which is both progressive on the time axis but also, viewed in terms of the difference between bus 1 and bus 2, changes between the message value N and initialization value I signal types. In addition, message values and initialization values are alternately transmitted in the region of the steering regulating units s1, s2. In FIGS. 3a and 3b, an embodiment is shown with a combined steering and braking system which, as in the preceding examples, comprises a state-determining device 3, a control and regulator unit 7, various actuators 11, 14 and a communications device 8 with two data buses 8a, b. The state-determining device 3 includes the measuring device 4 and the computational unit 5 with the computational devices f1, f2, the measuring device 4 comprising sensors for measuring the steering activation and the brake activation of a steering and brake unit 15. The measurement signals are evaluated in the state-determining device 5 and converted into state signals which are fed to the communications device 8. The regulator and control unit 7 is embodied as a distributed control loop and comprises not only the arithmetic unit 9 which is embodied redundantly with two arithmetic devices a1, a1, but also a first regulator unit 10 for the wheel brake with a total of four distributed braking regulating units b1 to b4 and a second regulator unit 13 for the steering with redundantly embodied steering regulating units s1, s2. The regulating units 10, 13 are each assigned actuators 11, 14 for the braking and the steering.

According to the communications matrix in FIG. 3b, the signals are transmitted in each cycle and in each data bus via the communications device 8 in the following time sequence: arithmetic unit 9—state-determining device 3—regulator unit 10 for the braking regulating unit 13 for the steering. In the time windows of the arithmetic unit 9 with the two arithmetic devices a1, a2 and the state-determining device 3 with the computational devices f1, f2, message values N are transmitted exclusively in all the cycles and on both buses, likewise in the two last time windows which are assigned to the steering regulating units s1, s2. The transmission schema for the braking regulating units b1 to b4 whose data is transmitted chronologically before that of the steering regulating units s1, s2 is the same as the schema described in the communications matrix according to FIG. 1b; message values N and initialization values I are generated alternately with offset timing and offset on both buses and also offset in successive cycles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering and braking system for a vehicle having at least one state-determining device for generating state signals which describe a state of the vehicle, at least one regulator and control unit which generates actuating signals for setting steering and braking actuators as a function of the state signals, and at least one data bus for transmitting the signals between the state-determining device, the regulator and control unit and the actuators, wherein:

the control and regulator unit comprises an arithmetic unit and a regulator unit;

set point signals for the steering and the brake are generated in the arithmetic unit and actuating signals for the actuators are generated in the regulator unit;

signals of all state determining devices, the arithmetic unit and regulator units of the steering and braking system are generated in successive cycles at defined time intervals;

in each cycle, the signals are generated in a sequence defined by the order, arithmetic unit—state-determining device—regulator unit;

signals generated by one of the state determining devices, the arithmetic unit and the regulator units form a starting point within a cycle; and the order of signals within the sequence remains the same irrespective of the starting point.

2. The steering and braking system according to claim 1, wherein at least one unit or device is of redundant configuration.

3. The steering and braking system according to claim 2, wherein redundant units or devices transmit and receive signals with staggered timing.

4. The steering and braking system according to claim 2, wherein two arithmetic devices of the arithmetic unit are provided.

5. The steering and braking system according to claim 2, wherein two computational devices of a computational unit of the state-determining device are provided.

6. The steering and braking system according to claim 2, wherein two steering regulating units are provided.

7. The steering and braking system according to claim 2, wherein a signal with an initialization value can be generated in each cycle in at least one unit or device.

8. The steering and braking system according to claim 7, wherein at least two signals with initialization values can be generated in each cycle.

9. The steering and braking system according to claim 7, wherein signals with initialization values can be generated in successive cycles in different devices of the units or devices.

10. The steering and braking system according to claim 1, wherein the data bus is of redundant configuration, having at least first and second buses.

11. The steering and braking system according to claim 10, wherein:

signal transmission takes place simultaneously on both data buses in each cycle; and signals transmitted on the first and second buses, respectively are at least partially different.

12. The steering and braking system according to claim 11, wherein initialization values are transmitted with staggered timing and on the first and second data buses.

13. The steering and braking system according to claim 12, wherein initialization values can be generated in the regulator units of the actuators.

14. The steering and braking system according to claim 13, wherein when both steering actuators and braking actuators are used, signals with the initialization values are generated in the braking regulating units.

15. The steering and braking system according to claim 1, wherein the state-determining device comprises:

a measuring device for the steering state and the brake pedal state; and a computational unit for processing measurement signals into state signals.

16. The steering and brake system according to claim 1, wherein the arithmetic unit for generating the actuating signals receives and processes measurement signals with vehicle-specific state variables.

17. A method for controlling at least one of a steering function and a braking function in a vehicle having at least one state-determining device for generating state signals which describe a state of the vehicle, at least one regulator and control device including an arithmetic unit and a regulator unit for generating actuating signals for a controlled function based on said state signals, and at least one data bus for transmitting signals between the state-determining device, the regulator and control device and the actuators, said method comprising:

said arithmetic unit generating set point signals for the controlled function, and said regulator unit generating actuating signals for the actuators;

causing signals of all state determining devices, the arithmetic unit and the regulator units of the controlled function to be generated in successive cycles at predetermined time intervals;

within each cycle, causing said signals to be generated according to a sequence defined by the order—arithmetic unit—state determining device—regulator unit;

causing signals generated by one of the state determining devices, the arithmetic unit and the regulator units to constitute a starting point within a cycle; and maintaining the order of signals within the sequence the same from cycle to cycle, irrespective of the starting point.

* * * * *